March 8, 1960 J. R. OISHEI 2,927,337
COORDINATED WINDSHIELD WASHING AND WIPING SYSTEM
Filed Oct. 25, 1955 2 Sheets-Sheet 1

INVENTOR.
John R. Oishei
BY
Bean Brooks Buckley & Bean
ATTORNEYS

March 8, 1960 J. R. OISHEI 2,927,337
COORDINATED WINDSHIELD WASHING AND WIPING SYSTEM
Filed Oct. 25, 1955 2 Sheets-Sheet 2
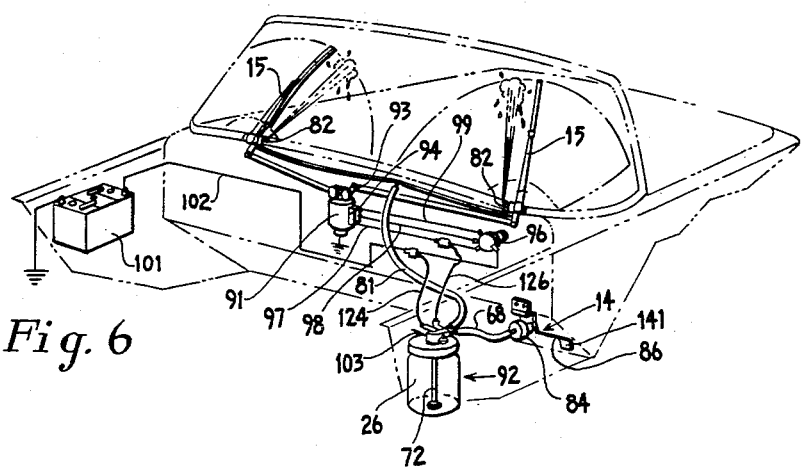
Fig. 6
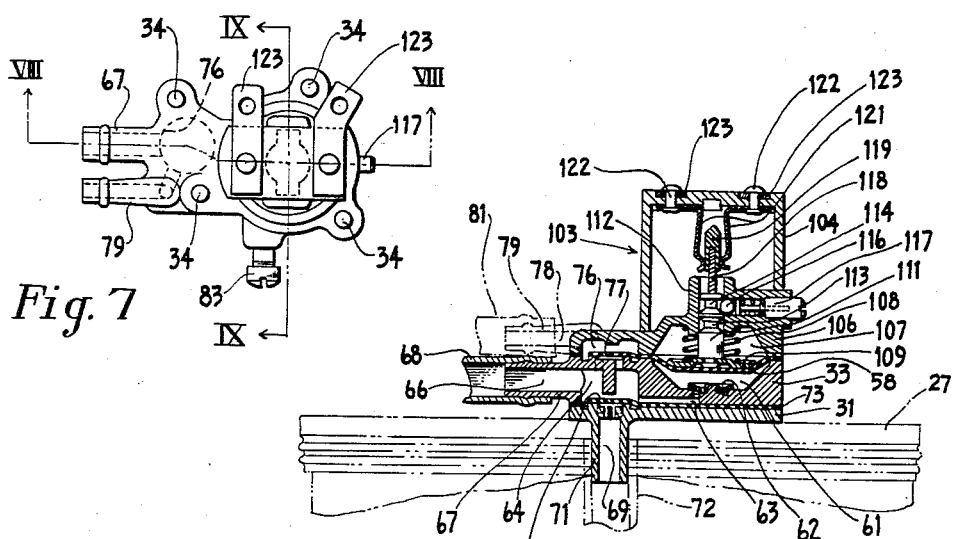
Fig. 7
Fig. 8
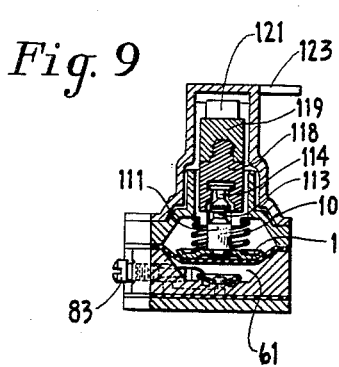
Fig. 9
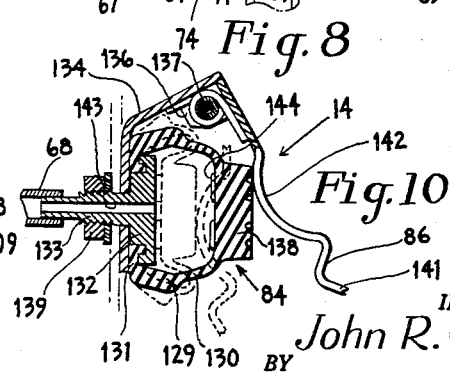
Fig. 10
INVENTOR.
John R. Oishei
BY
Bean Brooks Buckley & Bean
ATTORNEYS

United States Patent Office 2,927,337
Patented Mar. 8, 1960

2,927,337

COORDINATED WINDSHIELD WASHING AND WIPING SYSTEM

John R. Oishei, Buffalo, N.Y., assignor to Trico Products Corporation, Buffalo, N.Y.

Application October 25, 1955, Serial No. 542,619

5 Claims. (Cl. 15—250.02)

This invention relates to a windshield cleaning system for motor vehicles having a coordinated washer-wiping cycle wherein the ejection of a given quantity of cleaning liquid is initiated by means of a manually operated lever arrangement.

In the copending application of Raymond A. Deibel and William C. Riester, Serial No. 530,970, filed August 29, 1955, now Patent No. 2,877,486, relating to a coordinated washer-wiping windshield cleaning system, the system disclosed therein is arranged to provide a prolonged wiping cycle after application of cleaning liquid to the windshield. This is accomplished by means including a hydrostatically operated valve assembly which is arranged for automatic operation to provide the desired objective. The entire cleaning cycle, from the application of cleaning liquid to the windshield, to and including the wiper action, is accomplished by means which operate in an automatically predesignated manner after a control button is depressed by the vehicle operator.

The present invention, while achieving the same general results accomplished by the windshield cleaning system of the aforementioned patent, differs appreciably in a novel arrangement and operation. More particularly, the present invention utilizes a manually operable lever arrangement which is associated with a liquid pump, such as a collapsible bulb. The cleaning cycle is initiated by movement of the lever against the pump to collapse the latter, after which the remainder of the cycle will take place in an automatically predesignated manner. The principles of the present invention may be used either with vacuum operable wiper motors, or with electrically operable wiper motors.

A principal advantage of the windshield cleaning system of the present invention is that it is less complicated and more simplified as compared with the cleaning system of the aforementioned patent. Being less complicated it follows that among other things, certain savings in manufacture, installation and maintenance costs may be realized.

The object of this invention is to provide a coordinated windshield cleaning system having a cycle arranged for washing and wiping clean a windshield in an automatically predesignated manner upon initiation of the cycle by means of a manually operable lever arrangement, the term "manually" including foot operation also.

A further object of the invention is to provide a windshield cleaning system wherein a wiper unit and a washer unit are coordinated under a foot applied pressure and in such manner as to continue the wiping action after the removal of the foot pressure.

A further object of the invention is to provide a manually or foot actuated washer with wiper coupling means that quickly respond to the hydrostatic pressure in the washer system, means being provided to protect the system against excessive hydrostatic pressure.

Another object is to provide a coordinated washer-wiper system for vehicles which has manually operable means that may be operated in successive manner to produce continuous liquid spraying without interruption of the wiper operation, or the hold-over wiper operation which occurs after liquid spraying ceases.

A still further object of the invention is to eliminate serious diversion of the vehicle operator's attention to the business of vehicle operation, during initiation of the washer-wiper operating cycle.

Other objects are to provide a windshield cleaning system that is of simplified structure leading to economics in manufacture, installation and maintenance costs, is durable and reliable in operation, and which can be conveniently used by the operator to contribute appreciably to the safe operation of the vehicle.

Further objects and features of the invention will become more apparent from the following description when considered with the accompanying drawing wherein Fig. 1 is a fragmentary perspective view of a motor vehicle equipped with the windshield cleaning system of the present invention, and of the type having a vacuum powered wiper motor;

Fig. 6 is a fragmentary perspective view of a motor vehicle equipped with the windshield cleaning system of the present invention, and of the type having an electrically powered wiper motor;

Fig. 7 is a plan view of a pressure responsive actuator used in the windshield cleaning system illustrated in Fig. 6;

Fig. 8 is a section view as seen from line VIII—VIII in Fig. 7;

Fig. 9 is a section view as seen from line IX—IX in Fig. 7; and

Fig. 10 is a section view of a pump arrangement used in the invention.

Figures 1, 2, 3, 4, 5:
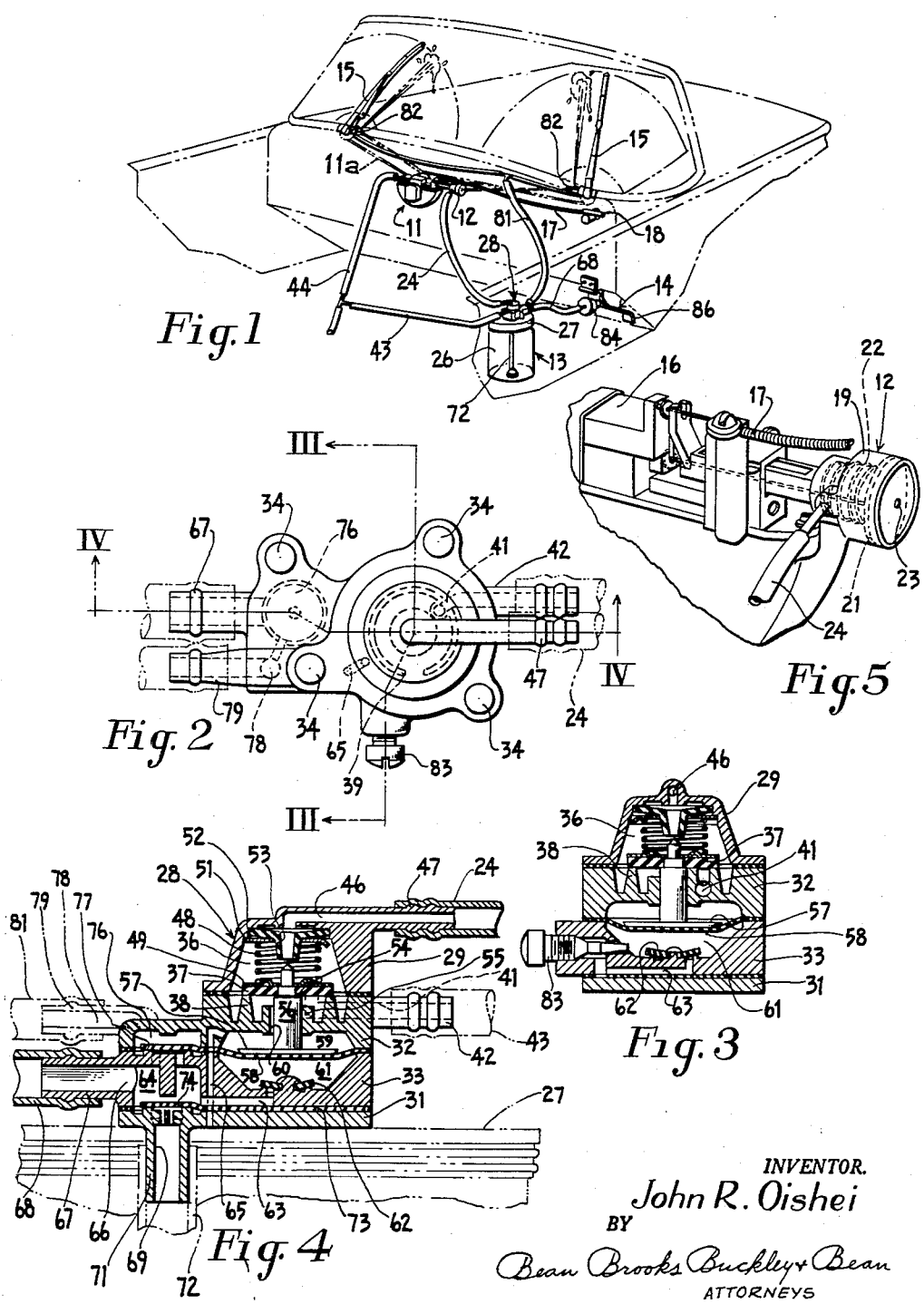
Fig. 2 is a plan view of a pressure responsive actuator used in the windshield cleaning system illustrated in Fig. 1.
Fig. 3 is a cross section view as seen from line III—III in Fig. 2.
Fig. 4 is a cross section view as seen from line IV—IV in Fig. 2.
Fig. 5 is a fragmentary perspective view of a coupler motor used in the windshield cleaning system of Fig. 1.

Referring now to the drawings, and more particularly to Fig. 1, an illustrative embodiment of the invention includes a vacuum operated wiper motor 11 having a coupler or coordinating motor 12 affixed thereto, a valve and reservoir unit 13, and a lever operated pump arrangement 14. The wiper motor 11 and coordinating motor 12 are similar to that shown and described in the aforementioned copending application. A motion transmission including cables 11' of conventional type connects the wiper motor to a pair of wiper blades 15. The motor 11 has a control valve 16 which is operatively positioned by either a Bowden wire 17, having an adjustment knob 18 located for conventional manipulation by the vehicle operator, or the coordinating motor 12 itself. The latter includes a piston chamber 19 in which is slidably arranged a piston 21 adapted to be urged to non-operative position by a compression spring 22. The piston chamber 19 is vented to atmosphere at one end by a hole 23 located on the side of the piston opposite to spring 22. Toward the other end of the piston chamber, an opening is formed for reception of a vacuum hose 24, which during washer operation, may cause the piston chamber to be evacuated, whereupon the spring 22 will be compressed by movement of the pitson 21, under the influence of atmospheric pressure acting through the hole 23. The purpose and manner in which the motors 11 and 12 function, during washer-wiper operation, should become more apparent as this disclosure progresses.

The valve and reservoir unit 13 comprises a reservoir 26, preferably in the form of a glass container which is threadably affixed to a cover 27, and a hydrostatic valve assembly 28 mounted upon the cover. The cover 27, has an opening (not shown) for venting the reservoir to atmosphere.

The valve assembly 28 includes a cover section 29, a base section 31, an upper intermediate section 32, and a lower intermediate section 33, all of said sections being held together as shown, by fastening means such as bolts, or rivets, 34. The cover section 29, and upper intermediate section 32, each have a cavity defining a vacuum chamber 36 in which is disposed a disc valve 37 adapted to seat upon a circular wall 38, which has a gap 39 at one part, as best seen in Fig. 2. A passageway 41, having an opening on the upper surface of wall 38, passes through a nipple 42 which is adapted to receive a vacuum hose 43 joining with a vacuum hose 44 connected to the wiper motor 11. Hoses 43 and 44 are arranged for connection with a vacuum source, such as is created in the engine manifold during engine operation. A passageway 46 leads from the chamber 36 and passes through a nipple 47 adapted to receive an end of the vacuum hose 24. A coil spring 48 is compressively arranged within the chamber 36 between a valve plate 49 seated on top of the valve 37, and a washer 51. Between the washer 51 and the top of chamber 36 is a valve 52 having an integral and flexible sleeve portion 53 extending downwardly through a hole formed in the washer 51. Disc valve 49 is supported at its center upon a shoulder 54 of a plunger, or valve 56, the latter of which is arranged for vertical movement in a boss 55 formed in the upper intermediate section 32. A small vertical passageway 60 formed in the boss 55 adjacent to the valve 56, serves as one part of a venting circuit, as will be later explained. The upper end of the valve 56 is of reduced diameter and is arranged to enter the sleeve portion 53 of valve 52 when valve 55 is in raised position.

When the upper end of the valve is projected into sleeve 53, sufficient diametric clearance is provided to allow air flow to occur from passageway 46 into the chamber 36, however, if movement of air flow should begin in the reverse direction, i.e., from chamber 36 into passageway 46, the flexible sleeve portion 53 will be caused to tightly embrace the upper end of valve 56 and thus prevent reverse air flow. In such manner, vacuum will be maintained in hose 24 during any brief or sudden period of reduced vacuum in chamber 36, and thereby prevent a premature cessation of wiper motor operation, as will be more apparent hereinafter.

The lower end of valve 56 has a flange 57 that sets upon a flexible diaphragm 58 which is maintained between the intermediate sections 32 and 33. The piston flange is arranged within a cavity 59 formed in upper intermediate section 32, while on the side of the diaphragm opposite piston flange 57, is a hydrostatic cavity 61 formed in the lower intermediate section 33. At the bottom of cavity 61 is a flexible disc valve 62, which is adapted for one-way flow of liquid into cavity 61 from a passageway 63 leading from a chamber 64 formed in the lower intermediate section 33. A passageway 65 opening into chamber 59, passes through the upper and lower intermediate sections, and exits into the top of reservoir 26.

Entering into chamber 64 is a horizontal passageway 66 formed in a nipple 67 adapted to receive the end of a hose 68, and a vertical passageway 69 formed in a nipple 71 adapted to receive the upper end of a liquid intake pipe 72, the lower end of which extends downwardly and near the bottom of reservoir 26. A flexible gasket 73 maintained between the lower intermediate section 33 and the base section 31, has a flap valve 74 which is adapted to allow one way flow of liquid from passageway 69 into chamber 64. Directly above chamber 64 is a cavity 76 formed in the upper intermediate section 32, which is arranged to receive liquid from chamber 64, and is separated therefrom by a flap valve 77 formed in the diaphragm 58. The flap valve 77 is adapted to permit one way flow of liquid from chamber 64 into cavity 76 in the manner, and for the purpose, of which will be more fully described hereinafter. Entering into cavity 76 is a passageway 78 formed in a nipple 79 which is adapted to receive one end of a hose 81; the other end of the hose extending upwardly and branching out for connection with liquid spray nozzles 82, positioned for ejection of cleaning liquid upon the windshield of the vehicle in a known manner. Positioned in the lower intermediate section 33, is a set screw 83 which is adapted for release of liquid from chamber 61 back into passageway 63, as best seen in Fig. 3. By adjustment of the set screw, the rate of liquid flow out of chamber 61 may be regulated.

Hose 68 provides an ebb and flow extension of a pump 84 of the pump arrangement 14. The pump 84 is preferably in the form of a rubber-like bulb which is adapted to be collapsed when a lever 86 is forced thereagainst by the vehicle operator. The lever 86, being of the second class with the bulb near the fulcrum, is effective to collapse the bulb with very little movement, or effort, on the part of the operator.

The hydrostatic valve assembly 28 serves a twofold purpose; first, to insure ejection of cleaning liquid upon the vehicle windshield prior to wiper blade operation, and second, to prolong wiper blade operation so that a few blade strokes are made after cessation of cleaning liquid application. A feature of the invention resides in the fact that when the operator is using the lever operated pump assembly 14, for washing and wiping the windshield, wiper motor operation cannot take place unless preceded by ejection of cleaning liquid upon the vehicle windshield. The washer and wiper operation are thus coordinated, thereby avoiding windshield smearing which could occur if an attempt were made to wipe the windshield without first wetting it. While the vehicle operator may initiate wiper motor operation by means of the control knob 18, it is to be expected that he would not normally attempt such operation if the vehicle windshield appeared to be dirty, to the extent as to cause windshield smearing. Rather, he would resort to use of the lever operated pump assembly 14, which would not function to initiate wiper motor operation, in the absence of a minimum supply of cleaning liquid in the reservoir i.e., at least enough to provide full pump charging.

The manner in which the washer-wiper system of the invention operates, can now be described. Assume that the reservoir 26 contains an ample supply of cleaning liquid, and that the hydrostatic circuit including bulb 84, hoses 68, 81, chamber 64, cavity 76, is charged, i.e., full of cleaning liquid, and also that the hoses 43 and 44 are connected to a vacuum source, such as prevails in the engine manifold during engine operation. The vehicle operator depresses the lever 86, preferably by the use of his left foot, thus collapsing bulb 84, and forcing the cleaning liquid therefrom. As a result, liquid flow occurs in hose 68, forcing liquid from chamber 64, past flap valve 77, into cavity 76, out passageway 78 into hose 81, and finally out of the nozzles 82 to be sprayed upon a predesignated target area on the windshield of the vehicle.

During the initial phase of washer operation, cleaning liquid is forced through passageway 63, past disc valve 62 and into chamber 61. Since passageway 63 is of reduced diameter, compared to the inner diameter of hose 81, the cavity 61 will be filled in a relatively gradual manner so that nozzle ejection action takes place before liquid pressure in cavity 61 acts against the diaphragm, to force valve 56 upwardly. When the latter action takes place, the valve 37 is lifted from its seated position on the wall 38, and the end of passageway 41 is uncovered thus exposing chamber 36 to the vacuum existing in vacuum hose 43. Hose 24 is evacuated by vacuum transmitted from chamber 36 through the hole in sleeve portion 53 of the valve 52, thereby causing an evacuation of piston chamber 19 of the coupler motor 12. Movement of piston 21 takes place due to atmospheric pressure operating through hole 23, thereby compressing the spring 19, and simultaneously moving the control valve 16 of the wiper motor to operating position, resulting in commencement of wiper blade movement.

A volume of cleaning liquid, equal to the charged volume of pump 84, will thus be sprayed upon the windshield. When the spraying is completed, the vehicle operator will release pressure he is exerting upon the lever 86, and atmospheric pressure acting upon the surface of the liquid in the reservoir 26, will force liquid upwardly through the intake pipe 72, past flap valve 74 into chamber 64, and then into the pump 84, via hose 68. Such liquid flow will stop when the pump 84 is fully charged, which is when the bulbous pump assumes external pressure-free condition. Cleaning liquid entering chamber 64 will not move upwardly into cavity 76 because the effective pressure acting atop flap valve 77, is greater than that acting against the bottom of said flap valve. In effect, the flap valve entraps the liquid in cavity 76, and maintains a supply of liquid in the hose 81 at all times between liquid spraying operations.

After cessation of liquid spraying operation, the wiper motor will continue to operate as long as vacuum is maintained in hose 24, which will be until the valve 37 seats upon the wall 38, and closes the end of passageway 41. When the latter occurs, the hose 24 is opened to atmosphere by a venting circuit including chamber 36, gap 39, passageway 60, cavity 59, and passageway 65. The spring 22 then forces piston 21 toward the end of piston chamber 19, thereby moving the control valve 16 to discontinue wiper motor operation. The time which it takes for the valve 49 to seat, will depend upon the rate at which liquid is flowing out of chamber 61, and back into passageway 63, to thereby permit the valve 56 to move downwardly toward chamber 61. The rate of liquid flow will depend primarily upon two factors, first, the amount of clearance obtained by adjustment of the set screw 83, and second, the strength, or compression factor of the spring 48. The latter factor is constant, and is a matter of design, while the former factor is a variable which may be changed by adjustment of the set screw 83. By simple adjustment of the set screw, the wiper motor may be regulated for prolonged operation after cessation of liquid spraying upon the windshield. In selecting a spring 48, it is necessary to keep in mind that the strength thereof should be strong enough to force the liquid from chamber 61 after operation of pump 84 ceases, however, it should not be so strong as to prevent timely upward rise of the valve 56, as the liquid pressure builds up in chamber 61.

The above described operation was based upon the assumption that the hydraulic circuit was fully charged at the time the operator initiated the operating cycle by pressing upon lever 86. It should be apparent that when the system of the invention is first installed, it will be necessary to compress the pump 14, one or more times, by means of lever 86 to charge the hydraulic circuit.

The embodiment illustrated in Figs. 6 to 9, represents the application of the principles of the invention to a vehicle having an electrically operated wiper motor. The hydraulic portion of said embodiment is similar to that described above, i.e., in connection with the vacuum operated wiper motor, and for the sake of convenience, like reference numerals will be used for like parts in the embodiment now to be described.

Referring more particularly to Fig. 6, the washer-wiper system of the invention includes an electrically operated wiper motor 91, a valve and reservoir unit 92, and lever operated pump arrangement 14. A motion transmission arrangement 93 of conventional type, connects the wiper motor to a pair of wiper blades 15. The motor 91 has a switch 94 which may be of the type affording high speed, low speed, and parking operation of the motor. A control switch 96, located in the vehicle for convenient manipulation by the vehicle operator, is connected to the switch 94 by three wires, 97, 98, 99, which are arranged for electrical connection of the motor 91 for high speed, low speed, or parking operations, respectively. The control switch is connected to a source of electrical current, such as a battery 101, by a wire 102. Both the battery 101 and motor 91 are grounded to the body of the vehicle as indicated.

The valve and reservoir unit 92, comprises a reservoir 26, and a valve and switch assembly 103. The latter includes a cover section 104, a base section 31, an upper intermediate section 106, and a lower intermediate section 33, all of said sections being held together as shown, by fastening means, such as bolts, or rivets 34. The valve portion of assembly 103 includes chamber 64 located in the lower intermediate section 33, horizontal passageway 66 formed in the nipple 67 and adapted to receive the end of hose 68, vertical passageway 69 formed in nipple 71 and adapted to receive the upper end of liquid intake pipe 72 positioned in the reservoir 26. Also included in said valve portion are the hydrostatic cavity 61, passageway 63, set screw 83 allowing for liquid drainage of cavity 61 into passageway 63, and cavity 76 located above the chamber 64. Flap valve 74 is arranged for one way flow of liquid from passageway 69 into chamber 64, and flap valve 77 is arranged for one way flow of liquid from chamber 64 into cavity 76, while disc valve 62 is arranged for one way flow of liquid from passageway 63 into cavity 61. Entering into cavity 76 is the passageway 78 formed in nipple 79, which is adapted to receive the end of hose 81 extending upwardly and branching out for connection with the liquid spray nozzles 82.

The valve portion of assembly 103 will be seen to be similar in structure and function to certain parts of the valve assembly 28 hereinbefore described; the main difference between assemblies 103 and 28, is in the electrical switch arrangement found in assembly 103, which will now be described.

Above cavity 61 is a cavity 107 which is formed in the upper intermediate section 106, and which contains a coil spring 108 compressively arranged between a plunger plate 109 and the top of cavity 107. Affixed to the plate 109 is a plunger 111 arranged for sliding vertical movement in a boss 112 formed in the upper intermediate section 106. The plunger is adapted for movement into two positions which are regulated by a detent arrangement. The latter consists of two detent grooves 113 and 114 formed on the plunger, and a detent, preferably in the form of a ball 116 which is adapted to engage said grooves. The detent ball is maintained in either of the detent grooves by means of a spring loaded adjustable plunger assembly 117. The holding effect of the detent ball 116 on the plunger 111, may be regulated by adjusting the degree of compression of the spring in detent assembly 117. The detent ball and groove arrangement produces a snap-action effect in movement of plunger 111.

Affixed to the upper end of plunger 111 is a contact bar 118 formed of electrical conducting material, such as copper, while attached to, and surrounding the upper end of the contact bar, is cap 119, formed of an electrical insulating material. Contact fingers, or bars 121 affixed to the top underside of the cover section 104, are arranged so that the free ends thereof will engage either the sides of the cap 119, or the sides of the contact bar 118 depending upon the vertical position of plunger 111. In the position of the switch illustrated in Fig. 8, the electrical circuit therethrough is open or broken, however, when plunger 111 is moved upwardly and detent ball 116 engages detent groove 113, the electric circuit is closed because the contact bars 121 will be in engagement with the contact bar 118. The contact bars 121 are preferably made from an electrical conducting material having good resiliency characteristics to assure proper contacting under repeated use, such material for example, being beryllium copper. Each of the contact bars 121 has electrical connection, via metallic rivets 122, with terminal bars 123 positioned on the outside top surface of the cover section 104. It may be mentioned that the various sections forming the valve and switch assembly 103, are preferably made of a non-conducting material to prevent any shorting of the electrical current passing through the switch arrangement of said assembly.

A wire 124 connects one of the terminal bars 123 to the power line 102 leading from the battery 101, while a wire 126 connects the other terminal bar to one of the wires extending between the motor switch 94 and the control switch 96, such as the high speed circuit wire 97. The high speed wire connection is believed preferable so that the wiping action is accomplished in a rapid manner, however, in certain applications other connection of wire 126 into the wiper motor control circuit may be desirable. In any event, such considerations are usually matters of design which will be readily comprehended by those skilled in the art.

The operation of the above described embodiment of the invention should be easily understood, since the hydraulic circuit portion thereof operates in exactly the same manner as that disclosed in connection with the embodiment shown in Figs. 1 to 5.

Assume that the hydrostatic circuit is charged, i.e., cleaning liquid is in pump 84, hose 68, chamber 64, cavity 76, and hose 81 up to spray nozzles 82, and that operative parts of the electrical switch portion of the assembly 103, are in the position illustrated in Fig. 8. The lever 86 being depressed by the vehicle operator, will cause the bulb to collapse and force liquid through hose 68, chamber 64, cavity 76 and into hose 81 to the spray nozzles 82, from whence it is sprayed upon the intended target areas of the vehicle windshield. During this liquid application phase of the system operating cycle, liquid is being admitted to the cavity 61, which shortly exerts pressure against the bottom of diaphragm 58. Such pressure will create an upward force acting upon the plunger 111, which will be resisted by the detent ball 116 being resiliently held in engagement with detent groove 114. When said upward force reaches a predetermined value, the holding resistance of the detent ball will be suddenly overcome, and plunger 111 will be rapidly moved upward. When this occurs, several things take place simultaneously; first, the electric circuit through the switch is closed by virtue of the fact that the contact bars 121 will engage the sides of contact bar 118; second, detent ball 116 will engage the detent groove 113; and third, the spring 108 will be compressed. In this condition of the switch, an electric circuit is completed between wires 102 and 97, so that the wiper motor 91 will be energized to provide wiping motion to the wiper blades 15.

After the liquid volume being sprayed upon the windshield is depleted and liquid ejection is terminated, the wiper motor will continue to operate as long as the liquid in cavity 61 exerts an upward pressure upon the plunger 111. With the cessation of liquid flow in the hydraulic circuit, there will be rapid fall in liquid pressure, which will of course be transmitted to the liquid in cavity 61. It may be mentioned, that under normal operation conditions, there will be a certain amount of air entrapped in the cavity 61, which will be compressed when the cavity is being filled with cleaning liquid. Any entrapped air will supplement the force of spring 108 acting upon the liquid in cavity 61, to cause liquid flow therefrom after the liquid spray operation is completed.

As the liquid is being forced from the cavity 61, past set screw 83 and into passageway 63, the plunger 111 will be urged downwardly; however, it will be prevented from movement by virtue of detent ball 116 being resiliently held in engagement with detent groove 114. When the detent holding effect is overcome by compression spring 108, the plunger 111 will be rapidly moved downward to the position illustrated in Fig. 8. The snap-action effect created by the ball detent arrangement, results in a quick make and break of the electric circuit, to thus avoid undesirable or prolonged sparking effect. The detent holding effect may be varied by adjustment of the spring in the detent assembly 117; the prolonged operation of the wiper motor may be regulated by adjustment of set screw 83, in the manner as pointed out with regard to the first described embodiment.

It will be seen that the embodiment of the invention in a vehicle having an electric wiper motor, as described above, will produce the same desired objectives as achieved in the system described in connection with Figs. 1 to 5. More particularly, the washer-wiper system will produce a coordinated washing and wiping cycle, wherein the liquid is first sprayed upon the windshield, followed by wiper operation during liquid spraying, and prolonged operation of the wiper blades after cessation of liquid spraying.

While only one type of electrical circuit has been shown and described, it should be apparent to those skilled in the art, that the principles of the invention may be applied without the exercise of inventive ingenuity, to practically any type of electrical circuit used to operate a wiper motor. For example, movement of the plunger 111 may be utilized to operate a multiple contact switch assembly, instead of the simple switch assembly illustrated, if a more complicated switching arrangement is needed for control of the wiper motor to achieve the stated objectives.

The pump arrangement 14 includes the bulb 84 and lever 86 adapted for collapse of the bulb when the operator depresses lever 86. Referring more particularly to Fig. 10, it will be seen that the bulb has a bellows portion 129 including a side wall 130 of reduced cross section, and a base portion 131 at the bottom side to receive an anchoring head 132 of a tubular mounting shank 133 to which hose 68 is attached. The shank may be secured in a bracket 134 having ears 136 extending therefrom to support by means of a pivot pin 137 the lever 86, which is of such length to secure approximately two to one mechanical advantage, or other desired leverage thereby to enable a quick compression of the bellows for so distending its side wall 130. By this arrangement, wherein the side wall 130 yields or distends, as indicated by the broken lines in Fig. 10 under a predetermined hydrostatic pressure, the bellows is converted into a spring motor to continue the liquid displacement through the connected nozzles, as long as the lever is held depressed and the rubber spring has spent itself. The central area of the top diaphragm portion of the bellows is thickened to provide in nature a plunger 138 which, when depressed, will serve as a liquid displacing member to create hydrostatic pressure sufficient to maintain a spray upon the windshield for several seconds of time.

Preferably the bracket, the pump and the lever are mounted as a unit by inserting the shank 133 through an opening in the firewall of the vehicle and securing it in a suitable manner as by a clamp nut 139. From such location the lever 86 extends downwardly in the form of a pedal 141 to receive the pressure from the toe portion of the operator's foot. The lever has a balled part 142 bearing upon the plunger 138 to depress it into the bellows chamber and down upon the anchored head 132 and to avoid closing off an outlet duct 143 arranged in the mounting shank 133 the underface of the plunger may be formed with clearance beads 144. Thereby the liquid within the expanded bellows will find its way to the delivery duct and through the connecting hose 68 and to the nozzles 82.

The elastic bulb being interposed between the foot lever and the coordinator provides a cushion for absorbing excess pressure on the lever and also serves as an energy storing means for continuing the hydrostatic pressure on the coordinator. This arrangement protects the system against careless and irregular use of the foot lever in that it modifies and controls the force of the liquid spray to a usable extent although generated under excessive foot pressure. Upon relieving the foot pressure the self-expanding pump 84 will intake a washing solution through the intake pipe 72 and the hose or conduit 68, and when the foot pressure is again applied to the lever the solution will be forced out of the same conduit 68 to the coordinator or hydrostatic valve assembly 28 to open the suction line to the windshield cleaner motor and hold it open after removing the foot pressure for the time interval for the hydrostatic pressure in the chamber 61 to dissipate. This time interval is adjustable to continue the wiper motor in operation for giving a plurality of wipes as desired. Since the washing solution is a noncompressible fluid, the system is protected against unusual and injurious hydrostatic pressure by reason of the distensibility of the pump chamber while at the same time the required build-up of the hydrostatic pressure within chamber 61 is expeditiously accomplished.

The valve assembly 28 not only includes the coordinating valve unit 37, 56, 58 for the control of the coordinating motor 12 but also serves as a conduit coupling member between the several conduits for both the wet and dry fluid pressure, this tending toward compactness and facilitating installation of the system on the motor vehicle. The coordination thus established provides the wiper motor with an air responsive control or throttle to initiate wiper operation only in the presence of hydrostatic pressure.

It should now be apparent that many features and advantages flow from the application of the principles of the invention. For example, the pump lever 86 may be operated successively by the vehicle operator to charge the pump 84 for continuous liquid spraying, if the windshield so requires, in which case the wiper motor operating cycle, including prolonged operation after cessation of liquid spraying, is not affected by such continuous pump operation. The prolonged, or hold-over operation of the wiper blades assures a dry wiping of the washed windshield. It is to be noted that the hold-over portion of the wiping cycle is accomplished without further attention on the part of the operator, i.e., it is not necessary for him to hold his foot on the lever 86 after initial collapse of the bulb 84. The sequential occurrence of the washing and wiping phases, is assured as well as the prolonged period of wiping operation, all in a simple and effective manner. For the first time, it may be said, a manually actuated coordinated power unit has been made safe against wiper smear of road splash, which is accomplished by making it impossible to use the washer-wiper arrangement if the reservoir is empty.

The foregoing disclosure has been given in detail without thought of limitation since the inventive principles involved are capable of assuming other physical embodiments without departing from the spirit of the invention and the scope of the appended claims.

What is claimed is:

1. A washer and wiper system comprising a wiper motor unit, a self-refilling washer power pump unit operable to eject liquid therefrom, foot actuated means for initiating the operation of the two units, and a hydrostatic device operable to open pneumatic pressure to the wiper motor for operating the latter, the two units being coordinately operated following initial actuation of said foot actuating means, both units continuing to operatively function following the discontinuance of foot actuation and independently thereof, said hydrostatic device having adjustable means to prolong wiper motor operation for a time after cessation of washer pump operation.

2. A windshield wiper and washer system including a wiper motor having a control valve, a self-refilling washer pump unit having root actuator means, a fluid responsive control mechanism for said washer pump unit including means for initiating the opening of the motor control valve by fluid pressure from said pump, said control mechanism including an adjustable pressure holding means acting independently of said foot actuator means for sustaining wiper motor operation for a time following the actuation of said pump.

3. A coordinated washer-wiper windshield cleaning system for use in a vehicle having a wiper motor for actuation of wiper blades, a reservoir for holding a supply of cleaning liquid, and nozzles for spraying cleaning liquid upon the windshield of the vehicle, said cleaning system comprising in combination a hydrostatic valve assembly provided with passageways forming part of a hydraulic circuit for conduction of cleaning liquid to the spray nozzles and including a portion defining a passageway opening into a chamber, a diaphragm in the chamber above the passageway opening, said diaphragm being extensible by liquid flowing into the chamber from said passageway opening, control means responsive to movement of said diaphragm to initiate operation of the wiper motor, adjustable means for regulating liquid flow from said chamber, and a manually operable pump having a self-refilling liquid carrying bulb and a lever adapted for compression of the bulb to force liquid therefrom and through the passageways in the hydrostatic valve assembly to the spray nozzles, and simultaneously to cause liquid flow into the chamber for exerting pressure on the diaphragm.

4. A coordinated windshield wiper and washer system comprising a wiper and a control therefor, a washer having a pump, a fluid pressure responsive coupler operatively connected to the wiper control, coordinating means interposed between the coupler and the pump and responsive to the hydrostatic pressure of the pump delivery to energize the coupler for turning on the wiper, force multiplying lever means operable to actuate the pump for effecting a quick response of the coordinating means, and energy storing means responsive to excessive hydrostatic pressure operable to sustain the pressure responsive action of the coordinator.

5. A windshield cleaner system comprising a wiper unit having an electric motor and a control switch therefor, a washer unit having a pump and a foot actuator therefor, wiper coordinating means responsive to the hydrostatic pressure developed during the ejection stroke of the foot actuator on the pump for moving the motor control switch to energize the wiper unit to operate its wiper, and an adjustable time delay hold-over means operable to maintain the hydrostatic pressure on said coordinating means to continue the operation of the wiper unit for a time interval.

References Cited in the file of this patent
UNITED STATES PATENTS 2,206,814    Horton                 July 2, 1940
2,743,473    Oishei et al.            May 1, 1956